C. C. CONVERSE.

Assignor by mesne assignments to JAMES DENSMORE.

APPARATUS FOR HEATING CARS AND OTHER VEHICLES.

No. 7,506. Reissued Feb. 13, 1877.

Witnesses:
Amos Densmore
J. Rock E

Inventor:
Charles Crozat Converse,
By James Densmore, Assignee.

N. PETERS, PHOTO-LITHOGRAPHER, WASHINGTON, D. C.

UNITED STATES PATENT OFFICE.

CHARLES C. CONVERSE, OF BROOKLYN, NEW YORK, ASSIGNOR, BY MESNE ASSIGNMENTS, TO JAMES DENSMORE.

IMPROVEMENT IN APPARATUS FOR HEATING CARS AND OTHER VEHICLES.

Specification forming part of Letters Patent No. 62,254, dated February 19, 1867; Reissue No. 7,506, dated February 13, 1877; application filed September 21, 1876.

*To all whom it may concern:*

Be it known that I, CHARLES CROZAT CONVERSE, of the city of Brooklyn, county of Kings, and State of New York, have invented an Improvement in Warming and Heating Cars and other Vehicles; and the following is a full and exact description thereof, reference being had to the accompanying drawing, in which—

Figure 1:
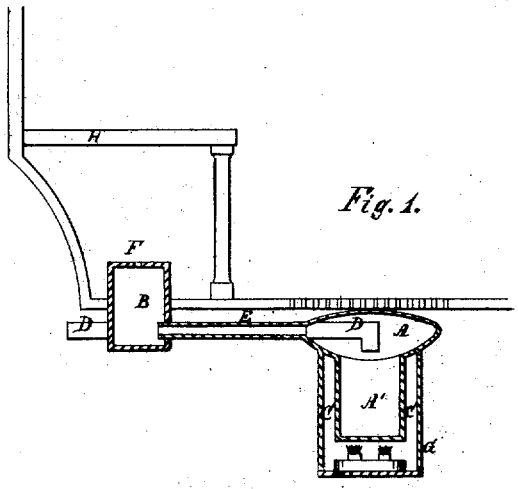
Figure 2:
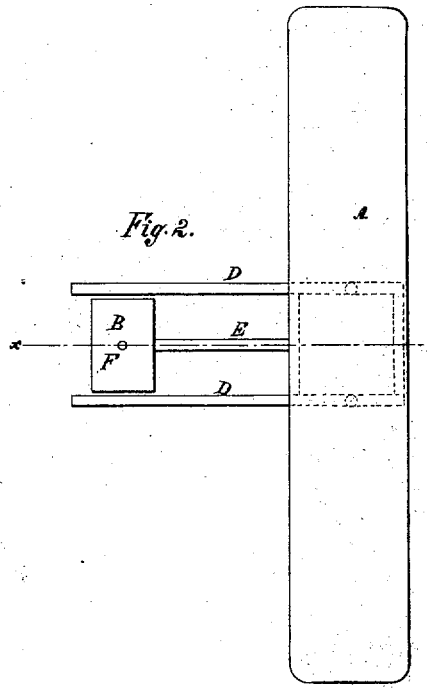
Figure 3:
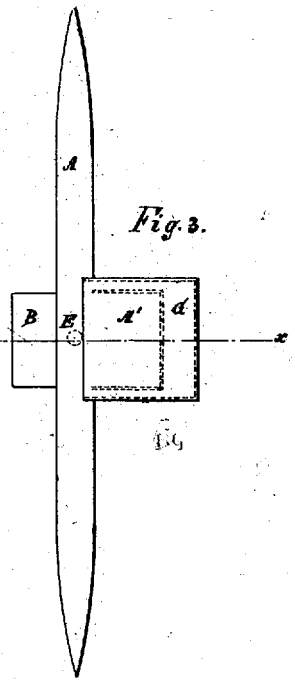

Figure 1 represents a sectional view, Fig. 2 a plan view, and Fig. 3 a side view.

The invention consists in an improved mode of warming or heating railroad cars and other vehicles, in which warm or hot liquid is the medium for imparting warmth or heat, and its nature is in combining a heater and boiler or receptacle with a railroad car or other vehicle, and with circulating currents of warm or hot liquid and the radiating surfaces of the receptacles and conducting pipes set under the passenger seats.

In the drawing, A represents a boiler or liquid receptacle, to be set on a railroad car or other vehicle; A′ a depression or well, a part of the under-side of the boiler A; G a furnace, surrounding the boiler-well A′; B an expansion-chamber or vessel; C a space between the inner-surface of the furnace G and the outer-surface of the boiler-well A′; D a flue, attached to and extended from the furnace G; E a conducting-pipe, between and opening into both the boiler A A′ and chamber B; E an opening in the top of the chamber B; and H a passenger-seat in such vehicle.

The boiler or receptacle A A′ may be arranged in any convenient place. There may be one under each seat, in which case they may be connected by conducting-pipes, and have a common condensing-chamber. In this illustration, the boiler A A′ is placed under the floor; and when so located, that part of the floor which is over the boiler-top A and conducting-pipe E should be perforated, or removed and the space covered by a grating or net-work or screen or the like, to allow the surface of the boiler-top and pipe to radiate heat into the vehicle. The chamber B may be under one of the seats, and, as in this illustration, there may be one under every seat, so as to accomplish the greatest possible distribution of heat to the comfort of each and every passenger. The chamber-opening F may be covered with a fine wire gauze, or be fitted with an ordinary valve or a weighted safety-valve, as may be found desirable. The conducting-pipe E may proceed from any convenient place in the boiler A A′ and discharge into the chamber B, and also return the condensed liquid to the boiler.

To operate the apparatus, pour the liquid into the opening F of the chamber B till the boiler A A′ and pipe E are filled and the chamber B partly filled, leaving only room for expansion when heated. Then close the opening F and make a fire in the furnace G. The fire may be a burning lamp or other suitable thing. This will warm or heat the liquid in the boiler-well A′, which liquid will thereby expand and become lighter and rise, and other cooler and heavier from above sink to the bottom; which latter liquid, in turn, will be warmed or heated and rise, and still other cooler and heavier from above take the place at the bottom; till a circulation is established between the boiler-well A′ and the chamber B; for the warm or hot liquid of the boiler-well A′ will rise and pass through the boiler-top A and the upper-side of the pipe E into the chamber B, but in the upward passage and in the chamber it will radiate its heat and become cooler and heavier and sink and pass down again through the under-side of the pipe to the bottom of the boiler. It is precisely on the principle of hot-water heaters in green-houses and like places, where a rising pipe extends from the heating vessel into an expansion-chamber, and a descending pipe extends from such chamber down, around, and back again to the heating vessel, the warm or hot water rising in the one pipe and the cooler descending in the other; but in this invention, the upward and downward currents pass each other in the same pipe E, the warmer and lighter current through the upper-side, and the cooler and heavier through the under-side. The circulation will continue while fire is maintained in the furnace G, the cooler, downward current receiving heat from the fire, and the warmer, upward current giving out that heat through the radiating surfaces of the vessels and pipes;

and the heat from the furnace, no matter where located, is collected, deported, and diffused under the seat and at the feet of each passenger.

The function of the boiler or receptacle A A′ and furnace G is to hold and heat the liquid used; the function of the pipe E is to conduct the warm or hot liquid from the receptacle A A′ to the chamber or vessel B, under the passenger-seat H; and the functions of the vessel B are first, as a reservoir to hold sufficient extra liquid to keep the receptacle A A′ and pipe E constantly full, second, as an expansion-chamber to give room for the expansion of the warmed or heated liquid, third, as a condensing-chamber to condense and make liquid whatever steam may be generated, and to cool and make heavier the warm or hot liquid so it will sink and force up the warmer and lighter below, and fourth, as a radiator to radiate and diffuse heat under the seat and against the feet of the passenger.

The great advantage of this invention consists in radiating and diffusing heat from circulating currents of warm or hot liquid, the mildest and most healthful warmth or heat attainable, directly under the seats and against the feet of the passengers: It is universally known that the greatest discomfort from traveling in cold weather, in no matter what kind of conveyance or vehicle, arises from cold feet—the greatest difficulty any one has is to keep the feet warm.

Therefore, having fully described the invention, what I claim, and desire to secure by Letters Patent, is—

The combination of a heater and boiler or receptacle with a railroad car or other vehicle, and with circulating currents of warm or hot liquid and the radiating surfaces of the liquid receptacles or conducting-pipes set under the passenger seats, substantially as described.

JAMES DENSMORE,
*Assignee.*

Witnesses:
FREDERICK SHOLES,
AMOS DENSMORE.